(12) United States Patent
Lin et al.

(10) Patent No.: US 8,034,260 B2
(45) Date of Patent: Oct. 11, 2011

(54) GEL ELECTROLYTE OF DYE SENSITIZED SOLAR CELL AND METHOD FOR MANUFACTURING THE SAME

(75) Inventors: Yueh-Wei Lin, Hsinchu (TW); Ya-Tin Hsu, Taipei (TW); Tsung-Hsiung Wang, Dali (TW); Jing-Pin Pan, Chutung Chen (TW); Meng-Chin Tsui, Yonghe (TW)

(73) Assignee: Industrial Technology Research Institute (TW)

( * ) Notice: Subject to any disclaimer, the term of this patent is extended or adjusted under 35 U.S.C. 154(b) by 412 days.

(21) Appl. No.: 12/425,007

(22) Filed: Apr. 16, 2009

(65) Prior Publication Data
US 2010/0102265 A1   Apr. 29, 2010

(30) Foreign Application Priority Data
Oct. 27, 2008   (TW) ................................ 97141155 A

(51) Int. Cl.
*H01B 1/00* (2006.01)
*H01B 1/02* (2006.01)
*H01L 31/00* (2006.01)

(52) U.S. Cl. ...................... 252/500; 252/518.1; 136/252
(58) Field of Classification Search .................. 252/500, 252/518.1; 136/252
See application file for complete search history.

(56) References Cited

U.S. PATENT DOCUMENTS

| 5,602,213 A * | 2/1997 | Hsu et al. ....................... 525/454 |
| 2007/0141461 A1 * | 6/2007 | Lin et al. ........................ 429/189 |
| 2008/0157021 A1 * | 7/2008 | Wang et al. ..................... 252/62.2 |
| 2008/0160418 A1 * | 7/2008 | Pan et al. ....................... 429/328 |

* cited by examiner

*Primary Examiner* — Mark Kopec
*Assistant Examiner* — Jaison Thomas
(74) *Attorney, Agent, or Firm* — Lowe Hauptman Ham & Berner, LLP

(57) ABSTRACT

Disclosed is a gel electrolyte for a photosensitive dye and method for manufacturing the same. First, bismaleimide and barbituric acid are dissolved in Brönsted base solution to form a gelling additive. Subsequently, the gelling additive is added into an ionic liquid electrolyte. The liquid electrolyte is then gelled at room temperature to form a gel electrolyte for the photosensitive dye utilized in dye sensitized solar cells. In addition, barbituric acid is further added into the gelling additive to enhance the gelling rate of the ionic liquid electrolyte.

14 Claims, 4 Drawing Sheets

GEL ELECTROLYTE OF DYE SENSITIZED SOLAR CELL AND METHOD FOR MANUFACTURING THE SAME

CROSS REFERENCE TO RELATED APPLICATIONS

This Application claims priority of Taiwan Patent Application No. 097141155, filed on Oct. 27, 2008, the entirety of which is incorporated by reference herein.

BACKGROUND OF THE INVENTION

1. Field of the Invention

The present invention relates to a gel electrolyte, and in particular relates to the composition thereof and method for manufacturing the same.

2. Description of the Related Art

A photovoltaic cell is a photoelectric semiconductor chip that directly generates electric power by sunlight. When the chip is exposed to sunlight, it simultaneously outputs current and voltage. The photovoltaic cell is a so-called solar cell. The solar cell regenerates power in an environmental friendly way, as no harmful gases, such as carbon dioxide, is produced from the power generating process. Referring to material-types thereof, the solar cell can be classified into silicon-based solar cells, dye sensitized solar cells, organic solar cells, and the likes. The most important factor for solar cells is conversion efficiency. Recently, the highest conversion efficiency for silicon-based solar cells is 29% for a single crystal silicon (in laboratory), 24% for a poly crystalline silicon, and 17% for an amorphous silicon.

A dye sensitized solar cell (DSSC) has recently been disclosed. Different from conventional photovoltaic cells, the top substrate of the DSSC is usually glass or transparent flexible polymer foil. A transparent conductive oxide such as fluorine doped tin oxide ($SnO_2$:F, FTO) or indium tin oxide (ITO) is formed on the glass. A porous layer of about 10 μm, such as nano-porous film composed of $TiO_2$ particles having diameters of about 10 to 20 nm, is formed on the transparent conductive oxide. A dye such as a ruthenium polypyridyl complex is then coated on the above nano-porous film to form the so-called top substrate. The bottom substrate of the DSSC is usually glass or transparent and flexible polymer foil. In addition to the transparent conductive oxide such as an FTO layer on the glass, a platinum layer is coated on the FTO layer to catalyze the reaction of the electrolyte. An electrolyte including iodine compound is injected between the top and bottom substrates. The highest conversion efficiency of the DSSC is only about 10%, however, the process for manufacturing the DSSC is simple. Therefore, the production cost or required power per kilowatt-hour for DSSC is minimal.

A typical electrolyte of the DSSC is a liquid electrolyte with leakage problem. A gel electrolyte is not initially used, because of the difficulty in injecting gel into space between the top and bottom of the substrates. Thus, the liquid electrolyte is added polymerizable monomer and a corresponding initiator, and injected into the top and bottom of the substrates. Subsequently, the electrolyte is heated to polymerize and become gelled. However, this method often damages the photosensitive dye of the DSSC due to requirement for a high polymerization temperature, which decreases device performance.

Accordingly, a suitable gel electrolyte that can be formed under mild conditions in a solar cell is called for to reduce DSSC manufacturing costs.

BRIEF SUMMARY OF THE INVENTION

The invention provides a gel electrolyte of a photosensitive dye, comprising a bismaleimide, a brönsted base solution; a barbituric acid, and an ionic liquid electrolyte.

The invention also provides a method for forming a gel electrolyte of a photosensitive dye, comprising dissolving bismaleimide and barbituric acid in a Brönsted base solution to form a gelling additive, and then adding the gelling additive to an ionic liquid electrolyte to gel the ionic liquid electrolyte at room temperature, thereby forming a gel electrolyte of a photosensitive dye.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
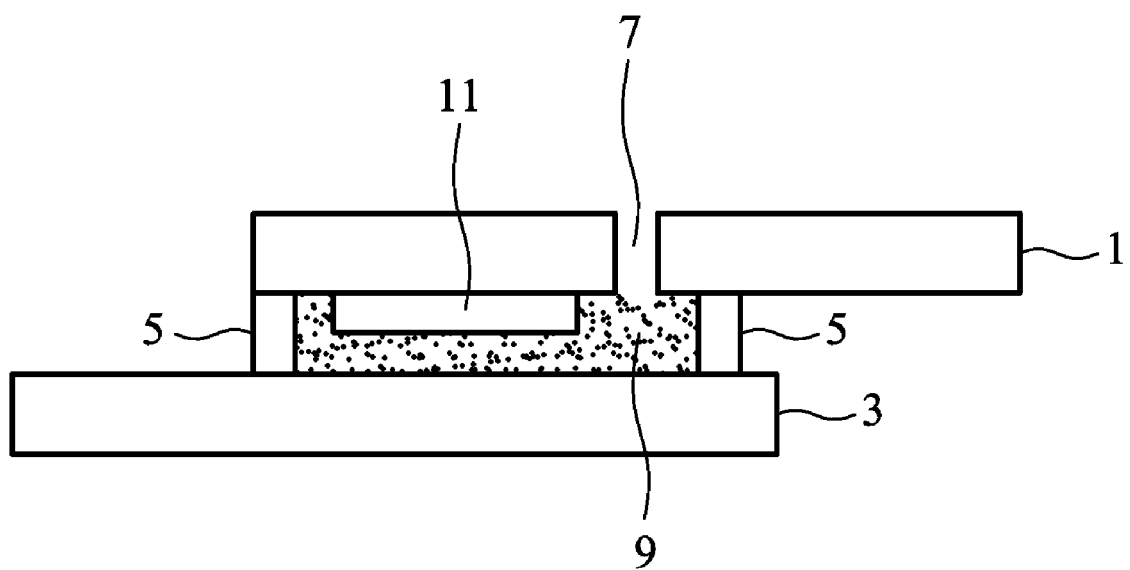
FIG. 1 shows a cross section of a solar cell in one embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

The invention provides a method for forming a gel electrolyte of a photosensitive dye for a solar cell. First, bismaleimide and barbituric acid are dissolved in a Brönsted base solution, heated for a period, and then cooled to form a gelling additive. Note that even if the gelling additive is not added to the so-called ionic liquid electrolyte, it will self-gel after a period of time. The gelling rate is related to the basity of the Brönsted base solution. The stronger the basity of the the Brönsted base solution, the faster the gelling rate. In general, a suitable bismaleimide for the invention has the formulae as Formula 1 and Formula 2 below:

(Formula 1)

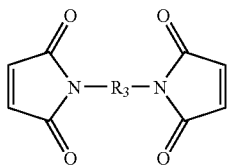

(Formula 2)

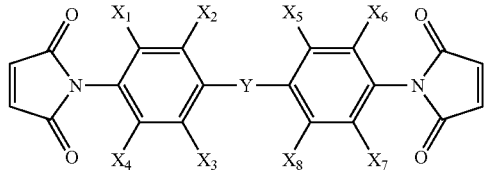

In Formula 1, $R_3$ is selected from —R—, —R—$NH_2$—R—, —C(O)—, —R—C(O)—R—, —R—C(O)—, —O—, —O—O—, —S—, —S—S—, —S(O)—, —R—S(O)—R—, —$SO_2$—, —($C_6H_5$)—, —R—($C_6H_5$)—R—, —R—($C_6H_5$)—O—, —($C_6H_5$)—($C_6H_5$)—, —R—($C_6H_5$)—($C_6H_5$)—R—, or —R—($C_6H_5$)—($C_6H_5$)—O—, and R is $C_{1-8}$ alkyl, ($C_6H_5$) is phenyl, and ($C_6H_5$)—($C_6H_5$) is biphenyl. In Formula 2, Y is selected from —R—, —C(O)—, —O—, —O—O—, —S—, —S—S—, —S(O)—, or —$SO_2$—, wherein each $X_1$, $X_2$, $X_3$, $X_4$, $X_5$, $X_6$, $X_7$, and $X_8$ is independently selected from halogen, hydrogen, $C_{1-8}$ alkyl, $C_{1-8}$ cycloalkyl, or $C_{1-8}$ silylalkyl, and R is $C_{1-8}$ alkyl, ($C_6H_5$) is phenyl, and ($C_6H_5$)—($C_6H_5$) is biphenyl.

The described bismaleimide can be N,N'-bismaleimide-4,4'-diphenylmethane, 1,1'-(methylenedi-4,1-phenylene)bismaleimide, N,N'-(1,1'-biphenyl-4,4'-diyl)bismaleimide, N,N'-(4-methyl-1,3-phenylene)bismaleimide, 1,1'-(3,3'dimethyl-1,1'-biphenyl-4,4'-diyl)bismaleimide, N,N'-ethylenedimaleimide, N,N'-(1,2-phenylene)dimaleimide, N,N'-(1,3-phenylene)dimaleimide, N,N'-thiodimaleimid, N,N'-dithiodimaleimid, N,N'-ketonedimaleimid, N,N'-methylenebis-maleinimid, bis-maleinimidomethyl-ether, 1,2-bis-(maleimido)-1,2-ethandiol, N,N'-4,4'-diphenylether-bis-maleimid, or 4,4'-bis(maleimido)-diphenylsulfone.

In the invention, the barbituric acid is represented as shown in Formula 3 below:

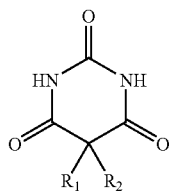

(Formula 3)

In Formula 3, each of $R_1$ and $R_2$ is independently selected from —H, —$CH_3$, —($C_6H_5$), —$CH(CH_3)_2$, —$CH_2CH(CH_3)_2$, —$CH_2CH_2CH(CH_3)_2$, or

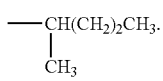

The electrolyte will gel faster with the barbituric acid, and the barbituric acid is suitable to be used with bismaleimide monomers with low polymerization rates and high heat resistance. In one embodiment, the bismaleimide and the barbituric acid have a molar ratio of about 1:1 to 10:1.

The Brönsted base solution includes N-methyl-2-pyrrolidone, dimethylformamide, dimethylacetamide, pyrrolidone, N-dodecylpyrrolidone, or combinations thereof. The Brönsted base solution can be added other Brönsted neutral solvents such as γ-butyrolactone or propylene carbonate to control the acidity/basicity of the solution.

The above gelling additive is added to the ionic liquid electrolyte to gel the electrolyte, wherein the gelling additive and the ionic liquid electrolyte have a weight ratio of 0.5:99.5 to 5:95. In one embodiment, the gelling additive and the ionic liquid electrolyte have a weight ratio of about 2:98. Because the gelling additive amount is low, it will not influence the inherent conductivity of the ionic liquid electrolyte. The ionic liquid electrolyte includes, but is not limited to, lithium iodide, iodine, 4-tert-butylpyridine, 1-methyl-3-propylimidazolium iodide, and solvent. The gelling additive of the invention can be applied to gel any liquid electrolyte, and is not limited to being applied to general ionic liquid electrolyte compositions such as metal ion, anion, cation, and solvent. For example, the lithium iodide may be replaced with alkali metal halides, the iodine may be replaced with corresponding halogens, and the 1-methy-3-propylimidazolium iodide may be replaced with 1-ethyl-3-methylimidazolium iodide or 1,2-dimethyl-3-propyl imidazolium iodide, if necessary. A suitable solvent for the described ionic liquid electrolyte includes acetonitrile, propylene carbonate, or a mixture thereof. In Examples of the invention, the solar cell with the ionic liquid electrolyte having solvent of a mixture of acetonitrile and propylene carbonate has higher conversion efficiency than that having single solvent such as acetonitrile or propylene carbonate.

Next, the electrolyte (still in liquid form) is injected into the space between the top and bottom of the substrates. The substrates are then sealed to complete the so-called DSSC. After sealing, the liquid electrolyte is left at room temperature for a period of time, or several or a number of minutes, to be gelled to form the gel electrolyte. Because the gel electrolyte does not need heating to be gelled, damage to the photosensitive dye is avoided. In the Examples, the gel in the gel electrolyte did not shrink gel or release liquid after being stationary for 2 weeks. The solar cell with the described gel electrolyte has a conversion efficiency of over 5%. In addition, the polymerized bismaleimide improves the heat resistance of the gel electrolyte, thereby efficiently extending lifetime of the solar cell.

EXAMPLES

Manufacturing of the Solar Cell Device

As shown in FIG. 1, a top substrate 1 with 1.5 cm*2.5 cm dimensions and a bottom substrate 3 with 1.5 cm*2.5 cm dimensions were selected. The top substrate 1 was glass. An ITO layer, a nano-porous film composed of $TiO_2$ having a diameter of about 10 nm to 20 nm, and a N719 Ruthenium photosensitive dye layer (cis-bis(isothiocyanato)-bis(2,2'-bipyridyl-4,4'-dicarboxylate)-Ru(II)bis-terabutylammonium) was sequentially formed overlying the top substrate 1. The bottom substrate 3 was glass. An ITO layer was formed overlying the glass, and a platinum layer was coated on the ITO layer. The top and bottom substrates 1 and 3 were firstly sealed by a sealing material 5. The liquid electrolyte of the Examples was injected into the space between the top and bottom substrates 1 and 3 and sealing material 5 through a little pore 7. The little pore 7 was sealed after the injection. After remaining stationary for several minutes to a number of minutes, the liquid electrolyte gelled to form the gel electrolyte 9, thereby completing the solar cell of the invention.

Example 1

Figure 2:
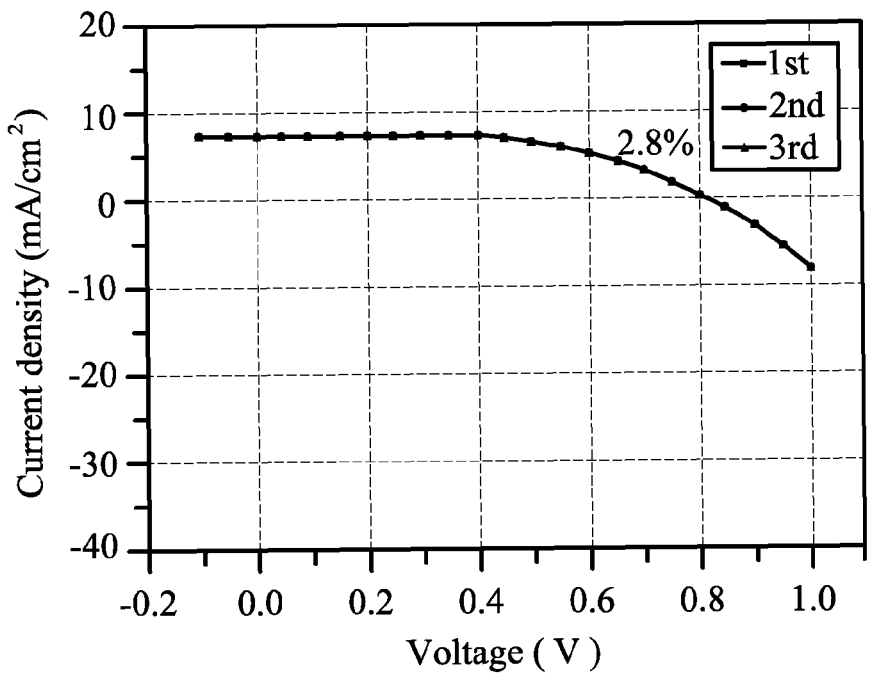
FIG. 2 shows current density versus voltage curves of a solar cell, having a gel electrolyte, exposed to a light of 100 mW/cm² in one embodiment of the invention.

10 g of N,N'-bismaleimide-4,4'-diphenylmethane was dissolved in the co-solvent of 23.57 mL of N-methyl-2-pyrrolidone and 23.57 mL of propylene carbonate, was then added 1.7869 g of barbituric acid, heated to 130° C. to react for 5 hours, and then cooled at room temperature to form a hyperbranched bismaleimide oligomer serving as gelling additive. Subsequently, an ionic liquid electrolyte including 0.6M 1-methyl-3-propylimidazolium iodide, 0.1M lithium iodide, 0.05M iodine, and 0.5M 4-tert-butylpyridine was prepared. 0.0986 g of the gelling additive, 0.22 g of the ionic liquid electrolyte, and 0.7466 g of acetonitrile were evenly mixed. The mixture was injected into the space between the top and bottom substrates, and the device was then sealed. The mixture was left at room temperature for a period of time to form the gel electrolyte, thereby completing the dye sensitized solar cell. Exposed to light of 100 mW/cm$^2$, the current density versus voltage curves of the solar cell are shown in FIG. 2. The described solar cell had conversion efficiency (η) of 2.8%, current density ($J_{SC}$) of 6.23 mA/cm$^2$, open circuit voltage (VOC) of 0.78V, and filling factor of 0.56.

Example 2

Figure 3:
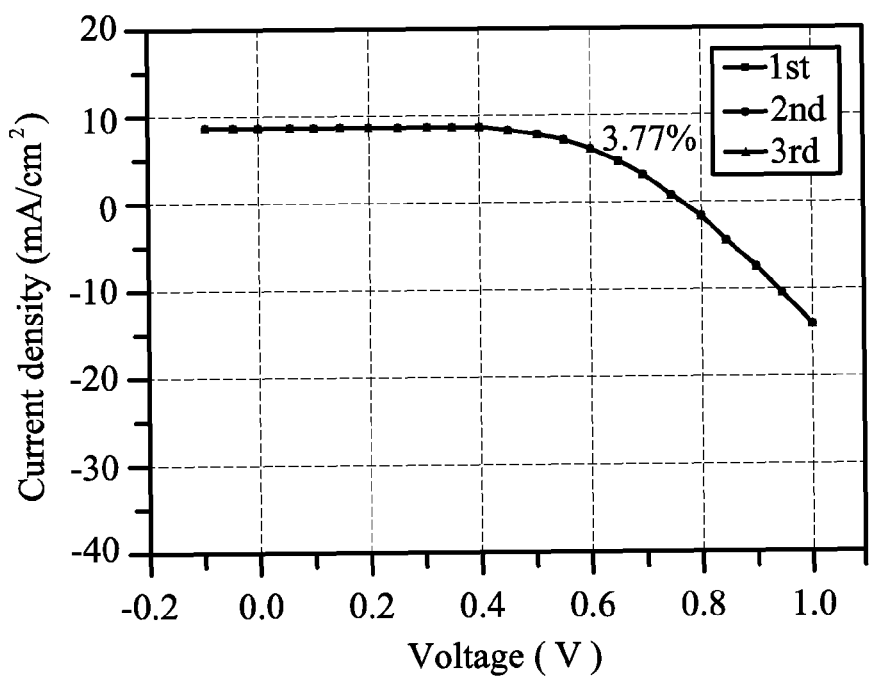
FIG. 3 shows current density versus voltage curves of a solar cell, having a gel electrolyte, exposed to a light of 100 mW/cm² in one embodiment of the invention.

10 g of N,N'-bismaleimide-4,4'-diphenylmethane was dissolved in the co-solvent of 23.57 mL of N-methyl-2-pyrrolidone and 23.57 mL of propylene carbonate, then added 1.7869 g of barbituric acid, heated to 130° C. to react for 5 hours, and then cooled to room temperature to form a hyperbranched bismaleimide oligomer serving as gelling additive. Subsequently, an ionic liquid electrolyte including 0.6M 1-methyl-3-propylimidazolium iodide, 0.1M lithium iodide, 0.05M iodine, and 0.5M 4-tert-butylpyridine was prepared. 0.0986 g of the gelling additive, 0.22 g of the ionic liquid electrolyte, and 0.5888 g of propylene carbonate were evenly mixed. The mixture was injected into the space between the top and bottom substrates, and the device was then sealed. The mixture was left at room temperature for a period of time to form the gel electrolyte, thereby completing the dye sensitized solar cell. Exposed to light of 100 mW/cm$^2$, the current density versus voltage curves of the solar cell are shown in FIG. 3. The described solar cell had conversion efficiency (η) of 3.77%, current density ($J_{SC}$) of 9.5 mA/cm$^2$, open circuit voltage (VOC) of 0.75V, and filling factor of 0.57.

Example 3

Figure 4:
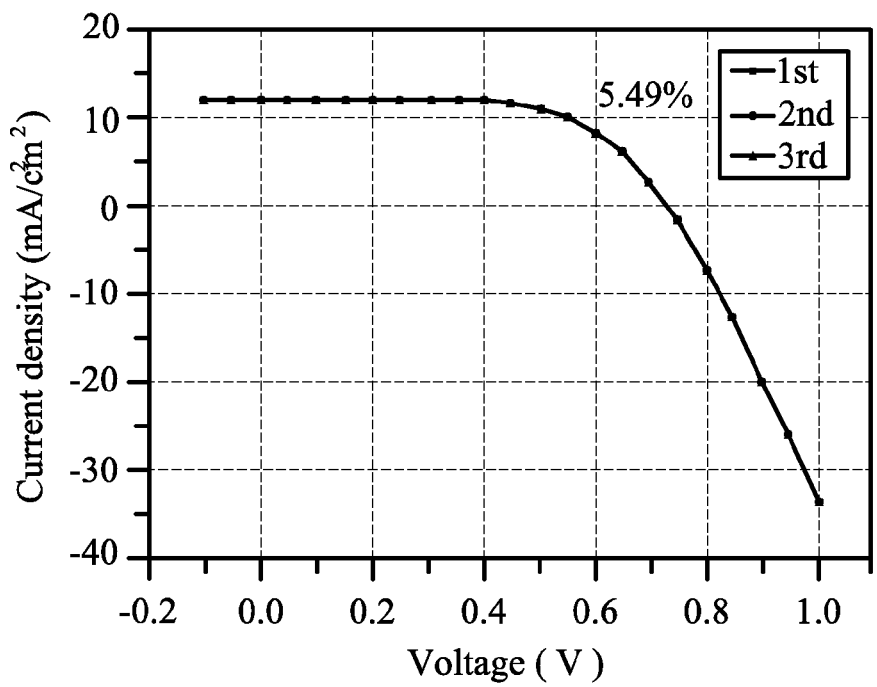
FIG. 4 shows current density versus voltage curves of a solar cell, having a gel electrolyte, exposed to a light of 100 mW/cm² in one embodiment of the invention.

10 g of N,N'-bismaleimide-4,4'-diphenylmethane was dissolved in the co-solvent of 23.57 mL of N-methyl-2-pyrrolidone and 23.57 mL of propylene carbonate, then added 1.7869 g of barbituric acid, heated to 130° C. to react for 5 hours, and then cooled to room temperature to form a hyperbranched bismaleimide oligomer serving as gelling additive. Subsequently, an ionic liquid electrolyte including 0.6M 1-methyl-3-propylimidazolium iodide, 0.1M lithium iodide, 0.05M iodine, and 0.5M 4-tert-butylpyridine was prepared. 0.0986 g of the gelling additive, 0.22 g of the ionic liquid electrolyte, 0.2944 g of propylene carbonate, and 0.3733 g of acetonitrile were evenly mixed. The mixture was injected into the space between the top and bottom substrates, and the device was then sealed. The mixture was left at room temperature for a period of time to form the gel electrolyte, thereby completing the dye sensitized solar cell. Exposed to light of 100 mW/cm$^2$, the current density versus voltage curves of the solar cell are shown in FIG. 4. The described solar cell had conversion efficiency (η) of 5.5%, current density ($J_{SC}$) of 12 mA/cm$^2$, open circuit voltage (VOC) of 0.72V, and filling factor of 0.63.

Example 4

Figure 5:
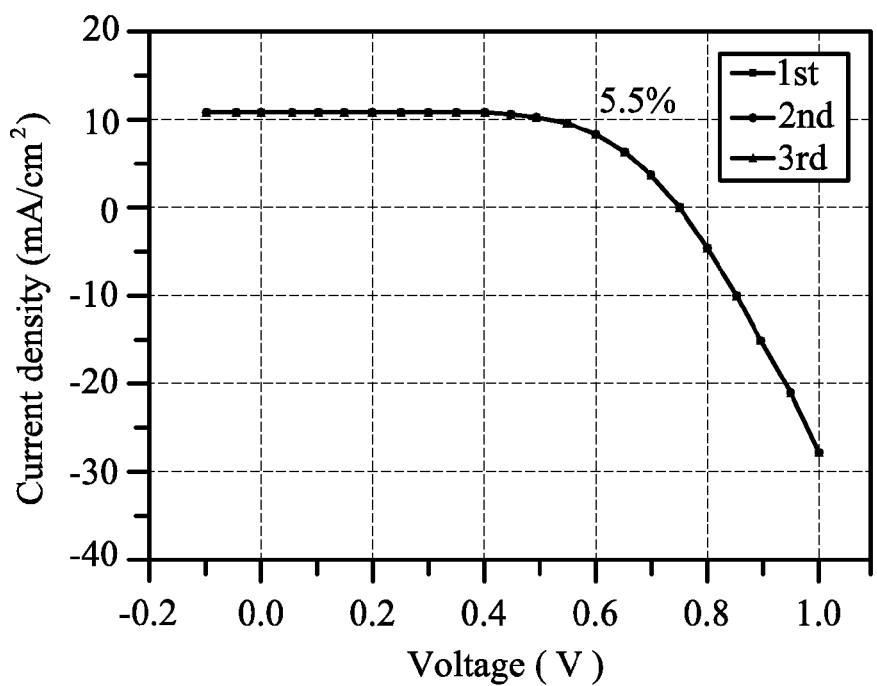
FIG. 5 shows current density versus voltage curves of a solar cell, having liquid electrolyte, exposed to a light of 100 mW/cm² in one embodiment of the invention.

An ionic liquid electrolyte including 0.6M 1-methyl-3-propylimidazolium iodide, 0.1M lithium iodide, 0.05M iodine, and 0.5M 4-tert-butylpyridine was prepared. 0.22 g of the ionic liquid electrolyte and 0.7466 g of acetonitrile were evenly mixed. The mixture was injected into the space between the top and bottom substrates, and the device was then sealed. The mixture was left at room temperature for a period of time to form the gel electrolyte, thereby completing the dye sensitized solar cell. Exposed to light of 100 mW/cm$^2$, the current density versus voltage curves of the solar cell are shown in FIG. 5. The described solar cell had conversion efficiency (η) of 5.5%, current density ($J_{SC}$) of 12.12 mA/cm$^2$, open circuit voltage (VOC) of 0.73V, and filling factor of 0.73.

Example 5

Figure 6:
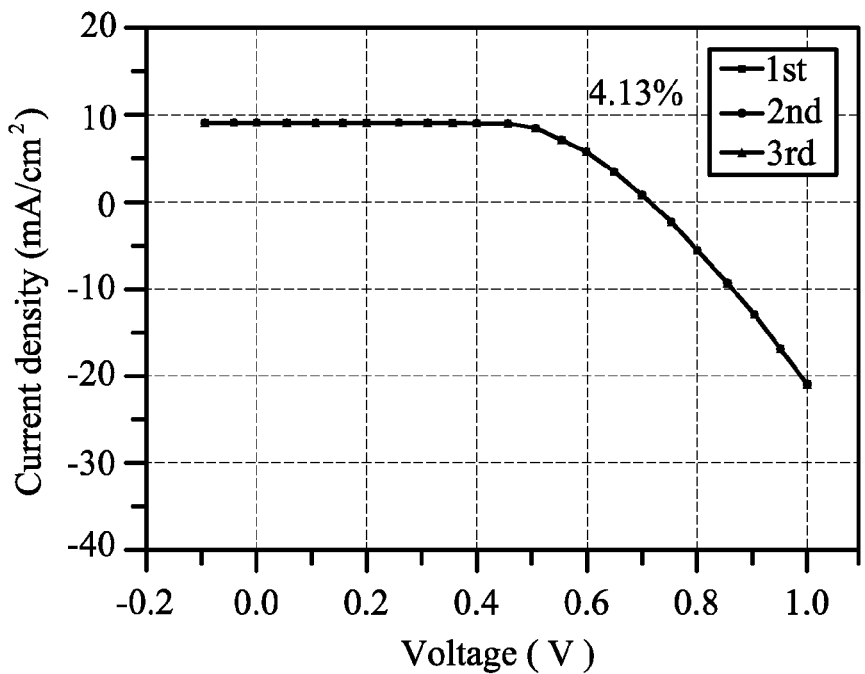
FIG. 6 shows current density versus voltage curves of a solar cell, having liquid electrolyte, exposed to a light of 100 mW/cm² in one embodiment of the invention.

An ionic liquid electrolyte including 0.6M 1-methyl-3-propylimidazolium iodide, 0.1M lithium iodide, 0.05M iodine, and 0.5M 4-tert-butylpyridine was prepared. 0.22 g of the ionic liquid electrolyte and 0.5888 g of propylene carbonate were evenly mixed. The mixture was injected into the space between the top and bottom substrates, and the device was then sealed. The mixture was left at room temperature for a period of time to form the gel electrolyte, thereby completing the dye sensitized solar cell. Exposed to light of 100 mW/cm$^2$, the current density versus voltage curves of the solar cell are shown in FIG. 6. The described solar cell had conversion efficiency (η) of 4.13%, current density ($J_{SC}$) of 9.33 mA/cm$^2$, open circuit voltage (VOC) of 0.71V, and filling factor of 0.62.

Example 6

Figure 7:
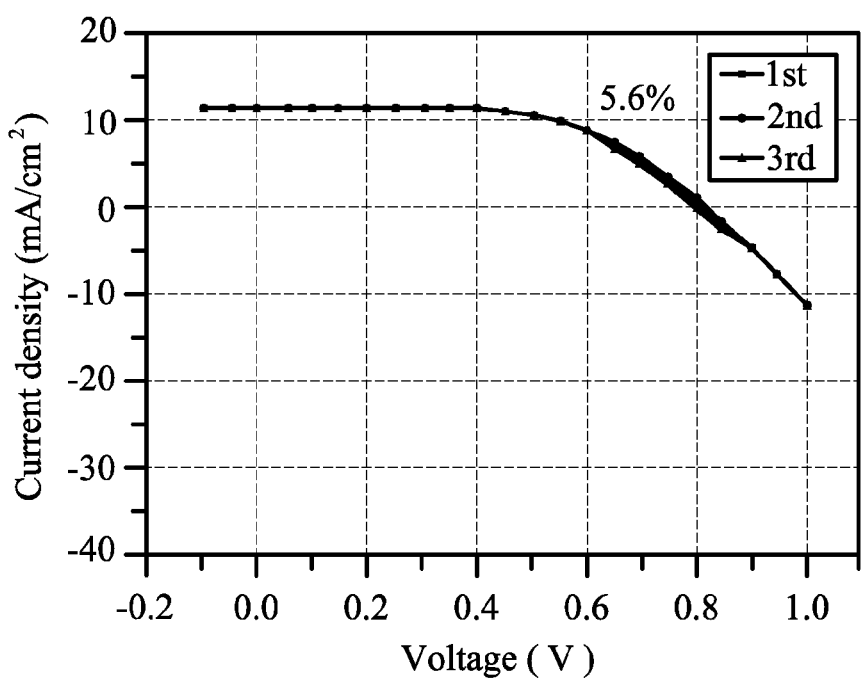
FIG. 7 shows current density versus voltage curves of a solar cell, having liquid electrolyte, exposed to a light of 100 mW/cm² in one embodiment of the invention.

An ionic liquid electrolyte including 0.6M 1-methyl-3-propylimidazolium iodide, 0.1M lithium iodide, 0.05M iodine, and 0.5M 4-tert-butylpyridine was prepared. 0.22 g of the ionic liquid electrolyte and 0.5888 g of propylene carbonate were evenly mixed. The mixture was injected into the space between the top and bottom substrates, and the device was then sealed. The mixture was left at room temperature for a period of time to form the gel electrolyte, thereby completing the dye sensitized solar cell. Exposed to light of 100 mW/cm$^2$, the current density versus voltage curves of the solar cell are shown in FIG. 7. The described solar cell had conversion efficiency (η) of 5.6%, current density ($J_{SC}$) of 11.2 mA/cm$^2$, open circuit voltage (VOC) of 0.75V, and filling factor of 0.66.

TABLE 1

(The measurements of the dye sensitized solar cells in Examples)

| | ionic liquid electrolyte composition | | Conversion efficiency ($\eta$, %) | current density ($J_{SC}$, mA/cm²) | open circuit voltage ($V_{OC}$, V) | filling factor (FF) |
|---|---|---|---|---|---|---|
| Example | solvent | gel additive | | | | |
| 1 | acetonitrile | present | 2.8 | 6.23 | 0.78 | 0.56 |
| 2 | propylene carbonate | present | 3.77 | 9.5 | 0.75 | 0.57 |
| 3 | acetonitrile/propylene carbonate | present | 5.49 | 12.0 | 0.72 | 0.63 |
| 4 | acetonitrile | absent | 5.5 | 12.12 | 0.73 | 0.73 |
| 5 | propylene carbonate | absent | 4.14 | 9.33 | 0.71 | 0.62 |
| 6 | acetonitrile/propylene carbonate | absent | 5.6 | 11.2 | 0.75 | 0.66 |

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dye sensitized solar cell comprising a space containing a gel electrolyte comprising:
   a bismaleimide;
   a brönsted base solution;
   a barbituric acid; and
   an ionic liquid electrolyte.

2. The dye sensitized solar cell of claim 1, wherein the bismaleimide is represented by the formula as below:

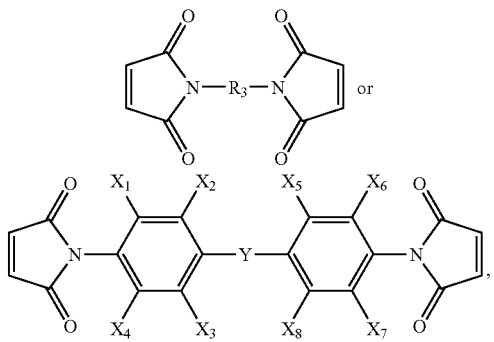

wherein $R_3$ is selected from —R—, —R—NH$_2$—R—, —C(O)—, —R—C(O)—R—, —R—C(O)—, —O—, —O—O—, —S—, —S—S—, —S(O)—, —R—S (O)—R—, —SO$_2$—, —(C$_6$H$_5$)—, —R—(C$_6$H$_5$)— R—, —R—(C$_6$H$_5$)—O—, —(C$_6$H$_5$)—(C$_6$H$_5$)—, —R—(C$_6$H$_5$)—(C$_6$H$_5$)—, —R—(C$_6$H$_5$)—(C$_6$H$_5$)— R—, or —R—(C$_6$H$_5$)—(C$_6$H$_5$)—O—,
Y is selected from —R—, —C(O)—, —O—, —O—O—, —S—, —S—S—, —S(O)—, or —SO$_2$—; each $X_1$, $X_2$, $X_3$, $X_4$, $X_5$, $X_6$, $X_7$, and $X_8$ is independently selected from halogen, hydrogen, C$_{1-8}$ alkyl, C$_{1-8}$ cycloalkyl, or C$_{1-8}$ silylalkyl, and R is C$_{1-8}$ alkyl, (C$_6$H$_5$) is phenyl, and (C$_6$H$_5$)—(C$_6$H$_5$) is biphenyl.

3. The dye sensitized solar cell of claim 1, wherein the bismaleimide comprises N,N'-bismaleimide-4,4'-diphenylmethane, 1,1'-(methylenedi-4,1-phenylene)bismaleimide, N,N'-(1,1'-biphenyl-4,4'-diyl) bismaleimide, N,N'-(4-methyl-1,3-phenylene)bismaleimide, 1,1'-(3,3'dimethyl-1,1'-biphenyl-4,4'-diyl)bismaleimide, N,N'-ethylenedimaleimide, N,N'-(1,2-phenylene)dimaleimide, N,N'-(1,3- phenylene)dimaleimide, N,N'-thiodimaleimid, N,N'-dithiodimaleimid, N,N'-ketonedimaleimid, N,N'-methylene-bis-maleinimid, bis-maleinimidomethyl-ether, 1,2-bis-(maleimido)-1,2-ethandiol, N,N'-4,4'-diphenylether-bis-maleimid, or 4,4'-bis (maleimido)-diphenylsulfone.

4. The dye sensitized solar cell of claim 1, wherein the Brönsted base solution comprises N-methyl-2-pyrrolidone, dimethylformamide, dimethylacetamide, pyrrolidone, or N-dodecylpyrrolidone.

5. The dye sensitized solar cell of claim 1, wherein the bismaleimide and the barbituric acid have a molar ratio of 1:1 to 10:1.

6. The dye sensitized solar cell of claim 1, wherein the ionic liquid electrolyte comprises lithium iodide, iodine, 4-tert-butylpyridine, 1-methyl-3-propylimidazolium iodide, and solvent.

7. The dye sensitized solar cell of claim 6, wherein the solvent comprises acetonitrile, propylene carbonate, or combinations thereof.

8. A method for forming a gel electrolyte of a photosensitive dye, comprising:
   dissolving a bismaleimide and a barbituric acid in a Brönsted base solution to form a gelling additive; and
   adding the gelling additive to an ionic liquid electrolyte for gelling of the ionic liquid electrolyte at room temperature to form a gel electrolyte of the photosensitive dye.

9. The method as claimed in claim 8, wherein the bismaleimide is represented by the formula as below:

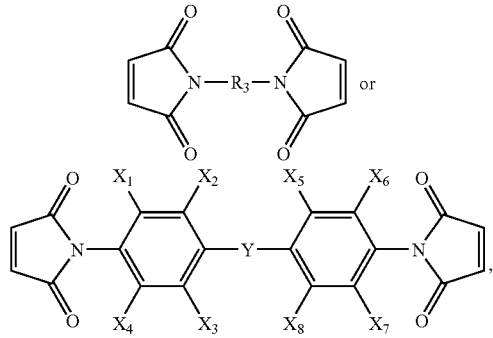

wherein $R_3$ is selected from —R—, —R—$NH_2$—R—, —C(O)—, —R—C(O)—R—, —R—C(O)—, —O—, —O—O—, —S—, —S—S—, —S(O)—, —R—S(O)—R—, —$SO_2$—, —($C_6H_5$)—, —R—($C_6H_5$)—R—, —R—($C_6H_5$)—O—, —($C_6H_5$)—($C_6H_5$)—, —R—($C_6H_5$)—($C_6H_5$), —R—($C_6H_5$)—($C_6H_5$)—R—, or —R—($C_6H_5$)—($C_6H_5$)—O—;

Y is selected from —R—, —C(O)—, —O—, —O—O—, —S—, —S—S—, —S(O)—, or —$SO_2$—;

each $X_1, X_2, X_3, X_4, X_5, X_6, X_7$, and $X_8$ is independently selected from halogen, hydrogen, $C_{1-8}$ alkyl, $C_{1-8}$ cycloalkyl, or $C_{1-8}$ silylalkyl, and R is $C_{1-8}$ alkyl, ($C_6H_5$) is phenyl, and ($C_6H_5$)-($C_6H_5$) is biphenyl.

10. The method as claimed in claim 8, wherein the bismaleimide comprises N,N'-bismaleimide-4,4'-diphenylmethane, 1,1'-(methylenedi-4,1-phenylene)bismaleimide, N,N'-(1,1'-biphenyl-4,4'-diyl)bismaleimide, N,N'-(4-methyl-1,3-phenylene)bismaleimide, 1,1'-(3,3'dimethyl-1,1'-biphenyl-4,4'-diyl)bismaleimide, N,N'-ethylenedimaleimide, N,N'-(1,2-phenylene)dimaleimide, N,N'-(1,3-phenylene)dimaleimide, N,N'-thiodimaleimid, N,N'-dithiodimaleimid, N,N'-ketonedimaleimid, N,N'-methylene-bis-maleinimid, bis-maleinimidomethyl-ether, 1,2-bis-(maleimido)-1,2-ethandiol, N,N'-4,4'-diphenylether-bis-maleimid, or 4,4'-bis(maleimido)-diphenylsulfone.

11. The method as claimed in claim 8, wherein the Brönsted base solution comprises N-methyl-2-pyrrolidone, dimethylformamide, dimethylacetamide, pyrrolidone, or N-dodecylpyrrolidone.

12. The method as claimed in claim 8, wherein the bismaleimide and the barbituric acid have a molar ratio of 1:1 to 10:1.

13. The method as claimed in claim 8, wherein the ionic liquid electrolyte comprises lithium iodide, iodine, 4-tert-butylpyridine, 1-methyl-3-propylimidazolium iodide, and solvent.

14. The method as claimed in claim 13, wherein the solvent comprises acetonitrile, propylene carbonate, or combinations thereof.

* * * * *